US 11,449,426 B1

(12) United States Patent
Gupta

(10) Patent No.: US 11,449,426 B1
(45) Date of Patent: Sep. 20, 2022

(54) I/O METHOD AND SYSTEMS THAT INCLUDES CACHING DATA IN THE NETWORK INTERFACE CONTROLLER (NIC) USING META-IDENTIFIER (META-ID) FOR THE DATA

(71) Applicant: Pensando Systems Inc., Milpitas, CA (US)

(72) Inventor: Anish Kumar Gupta, Fremont, CA (US)

(73) Assignee: Pensando Systems, Inc., Milpitas, CA (US)

( * ) Notice: Subject to any disclaimer, the term of this patent is extended or adjusted under 35 U.S.C. 154(b) by 0 days.

(21) Appl. No.: 17/351,751

(22) Filed: Jun. 18, 2021

(51) Int. Cl.
*G06F 13/00* (2006.01)
*G06F 12/0831* (2016.01)
*G06F 13/28* (2006.01)

(52) U.S. Cl.
CPC .......... *G06F 12/0835* (2013.01); *G06F 13/28* (2013.01); *G06F 2213/0026* (2013.01); *G06F 2213/3808* (2013.01)

(58) Field of Classification Search
CPC ................. G06F 13/28; G06F 12/0835; G06F 2213/0026; G06F 2213/3808
See application file for complete search history.

(56) References Cited

U.S. PATENT DOCUMENTS

2009/0112874 A1\* 4/2009 Fisher .................. G06F 16/986
707/999.005
2021/0336845 A1\* 10/2021 Kumble Seetharama ..................
H04L 41/0859

OTHER PUBLICATIONS

Mohammad, Alian et al. "NetDIMM: Low-Latency Near-Memory Network Interface Architecture", MICRO '52, Oct. 12-16, 2019, Columbus, OH, USA, (2019), 13 pgs.

(Continued)

*Primary Examiner* — Tammara R Peyton
(74) *Attorney, Agent, or Firm* — Loza & Loza, LLP

(57) ABSTRACT

Methods and systems for operating an I/O system are disclosed. Embodiments of the present technology may include a method that involves receiving data at a NIC, caching the data at the NIC, generating a meta-identifier (meta-ID) for the data, writing the data to a host via a PCIe interface, providing the meta-ID to the host, receiving a request for a service at the NIC from the host, the request including the meta-ID, accessing the cached data in the NIC using the meta-ID, and performing the service on the cached data that was accessed in the NIC using the meta-ID.

23 Claims, 9 Drawing Sheets

(56) References Cited

OTHER PUBLICATIONS

Nguyen, Viet Anh et al. "Reducing Data Copies between GPUs and NICs", 2014 IEEE International Conference on Cyber-Physical Systems, Networks, and Applications, (2014), 6 pgs.
Flajslik, Mario et al. "Network Interface Design for Low Latency Request-Response Protocols", 2013 USENIX Annual Technical Conference (USENIX ATC '13), (2013), pp. 333-345.
Forencich, Alex et al. "Corundum: An Open-Source 100-Gbps NIC", 2020 IEEE 28th Annual International Symposium on Field-Programmable Custom Computing Machines (FCCM), (2020), 9 pgs.
Kaufmann, Antoine et al. "High Performance Packet Processing with FlexNIC", ASPLOS '16 Apr. 2-6, 2016, Atlanta, Georgia, USA, (2016), pp. 67-81.
Liu, Ming et al. "Offloading Distributed Applications onto SmartNICs using iPipe", SIGCOMM '19, Aug. 19-23, 2019, Beijing, China, (2019), 16 pgs.
Neugebauer, Rolf et al. "Understanding PCIe performance for end host networking", SIGCOMM '18, Aug. 20-25, 2018, Budapest, Hungary, (2018), pp. 327-341.

\* cited by examiner

I/O METHOD AND SYSTEMS THAT INCLUDES CACHING DATA IN THE NETWORK INTERFACE CONTROLLER (NIC) USING META-IDENTIFIER (META-ID) FOR THE DATA

BACKGROUND

In data networks, input/output (I/O) systems such as switches, routers, and network interface controllers/cards (NICs) receive data (e.g., packets) at input interfaces, process the received data, and then forward the data to one or more output interfaces. It is important that such I/O systems operate as quickly as possible in order to keep pace with a high rate of incoming data. Additionally, I/O systems such as network interface controllers/cards often include a network interface such as a high speed Ethernet interface and a host interface such as a Peripheral Component Interconnect Express (PCIe) interface. In some cases, operations implemented by the I/O system may involve multiple transfers of large blocks of data between the host and the I/O system via the PCIe interface, which can be become a performance bottleneck.

SUMMARY

Methods and systems for operating an I/O system are disclosed.

Embodiments of the present technology may include a method that involves receiving data at a NIC, caching the data at the NIC, generating a meta-identifier (meta-ID) for the data, writing the data to a host via a PCIe interface, providing the meta-ID to the host, receiving a request for a service at the NIC from the host, the request including the meta-ID, accessing the cached data in the NIC using the meta-ID, and performing the service on the cached data that was accessed in the NIC using the meta-ID.

In an embodiment, the meta-ID is provided to the host via an RX completion descriptor.

In an embodiment, the meta-ID is provided to the host via an RX completion descriptor for storage in an RX completion queue at the host.

In an embodiment, the meta-ID is stored at the host in an RX completion queue.

In an embodiment, the meta-ID is stored at the host as a RX completion descriptor of an RX completion queue.

In an embodiment, the data is cached in a volatile memory of the NIC.

In an embodiment, the request includes the meta-ID in a request descriptor that is provided to the NIC from the host.

In an embodiment, The method of claim 1, wherein the service is an offload service.

In an embodiment, the service is a compression service.

In an embodiment, the service is an encryption service.

In an embodiment, performing the service on the cached data involves compressing the data at the NIC, the method further comprising writing the compressed data from the NIC to the host via the PCIe interface.

In an embodiment, performing the service on the cached data involves compressing the data at the NIC, the method further comprising transmitting the compressed data from the NIC via a network interface of the NIC.

In an embodiment, the method further involves after the service is performed on the cached data, transmitting the cached data from the NIC via a network interface of the NIC.

In an embodiment, the method further includes writing second data to the host via the PCIe interface, wherein the second data that is written to the host is generated in response to performance of the service.

In an embodiment, the data is written from the NIC to the host using a Direct Memory Access engine.

An embodiment of a NIC is also disclosed. The NIC includes a network interface, a PCIe interface, memory, and a processor configured to cache data that is received at the NIC in the memory, generate a meta-identifier (meta-ID) for the data, write the data to a host via the PCIe interface, provide the meta-ID to the host, receive a request for a service at the NIC from the host, the request including the meta-ID, access the cached data in the memory of the NIC using the meta-ID, and perform the service on the cached data that was accessed in the memory of the NIC using the meta-ID.

In an embodiment, the meta-ID is provided to the host via an RX completion descriptor and stored in an RX completion queue at the host.

Another embodiment of a method is disclosed. The method involves receiving a request for a service at a NIC via a PCIe interface, the request including a meta-ID, determining if there is cached data corresponding to the meta-ID at the NIC, and if it is determined that there is cached data corresponding to the meta-ID at the NIC, performing the service on the cached data at the NIC using the meta-ID, and if it is determined that there is not cached data corresponding to the meta-ID at the NIC, reading data from a host via the PCIe interface in response to the request and then performing the service on the read data.

In an embodiment, the method further includes writing second data to the host via the PCIe interface, wherein the second data that is written to the host is generated in response to performance of the service.

Another embodiment of a method is disclosed. The method involves receiving data at a NIC, caching the data at the NIC, generating a meta-identifier (meta-ID) for the data, writing the data to a host via a PCIe interface, providing the meta-ID to the host, generating, at the host, a request for a service, wherein the request includes the meta-ID, providing the request from the host to the NIC, accessing the cached data in the NIC using the meta-ID, and performing the service on the cached data that was accessed using the meta-ID.

In an embodiment, the meta-ID is provided from the NIC to the host in an RX completion descriptor and wherein the RX completion descriptor is stored in an RX completion queue of the host.

In an embodiment, the method includes writing second data to the host via the PCIe interface, wherein the second data that is written to the host is generated in response to performance of the service.

In an embodiment, performing the service on the cached data involves compressing the data, the method further comprising writing the compressed data to the host via the PCIe interface.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1A:
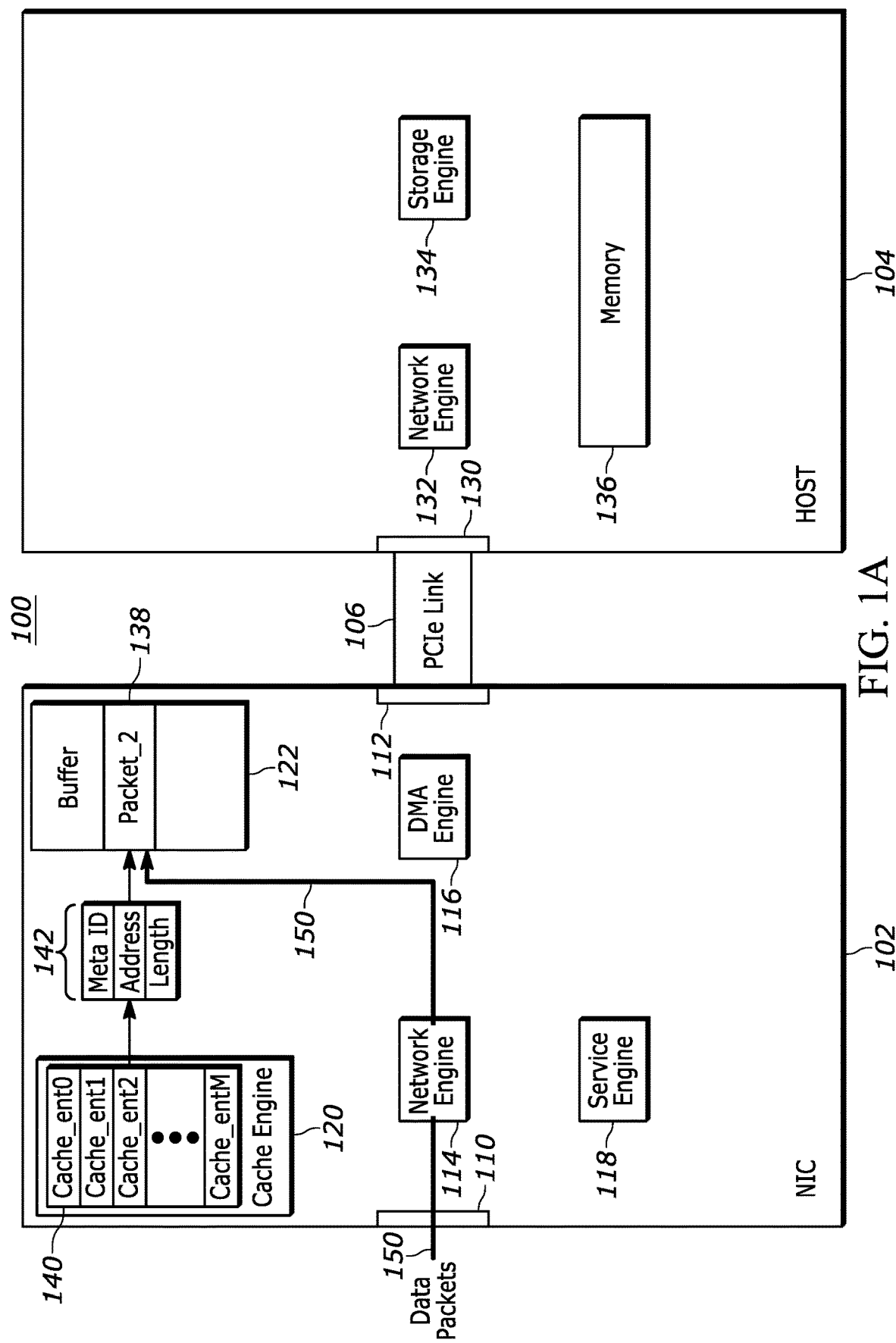
FIG. 1A depicts an example of a computing system that includes a NIC and a host that are connected by a PCIe link.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In accordance with an embodiment of the invention, a technique for operating an I/O system involves receiving data at a network interface controller (NIC), caching the data at the NIC, generating a meta-identifier (meta-ID) for the data, writing the data to a host via a PCIe interface, providing the meta-ID to the host, receiving a request for a service at the NIC from the host, the request including the meta-ID, accessing the cached data in the NIC using the meta-ID, and performing the service on the cached data that was accessed in the NIC using the meta-ID. In an embodiment, the meta-ID is provided to the host via an RX completion descriptor and the meta-ID is stored in an RX completion queue at the host. Examples of the service performed on the cached data at the NIC include offload services such as compression, encryption, and/or mirroring of the data. In some embodiments, the data that is compressed and/or encrypted at the NIC is then written back to the host via the PCIe interface and in other embodiments, the compressed and/or encrypted data is transmitted from the I/O system via a network interface, such as an Ethernet interface, to another computing system. Whether the compressed and/or encrypted data is written back to the host via the PCIe interface or transmitted from the I/O system via the network interface, at least one transfer of the data from the host to the I/O system is avoided when the service is performed on data that is cached at the I/O system. That is, when there is a cache hit and the service (e.g., compression and/or encryption) is performed at the I/O system on cached data, the data does not need to be read from the host and transferred across the PCIe interface for the service to be performed at the I/O system. Thus, the technique can conserve valuable PCIe interface resources between an I/O system and a host.

An example of a technique for operating a computing system that includes an I/O system and a host connected by a PCIe interface is described with reference to FIGS. 1A-5.

FIG. 1A depicts an example of a computing system 100 that includes a NIC 102 and a host 104 that are connected by a PCIe link 106. As shown in FIG. 1A, the NIC includes a network interface 110, a PCIe interface 112, a network engine 114, a Direct Memory Access (DMA) engine 116, a service engine 118, a cache engine 120, and a buffer 122 and the host includes a PCIe interface 130, a network engine 132, a storage engine 134, and memory 136. In an embodiment, the PCIe link is formed by mating of the PCIe interface 112 of the NIC and the PCIe interface 130 of the host as is known in the field.

With regard to the NIC 102, the network interface 110 provides network connectivity as is known in the field. For example, the network interface includes a 25 GB or 100 GB Ethernet interface, or 2×25 GB, or 2×100 GB Ethernet interfaces. The network engine 114 includes hardware, software, and/or firmware implementations of the networking protocols, e.g., L2, L3, and L4 protocols, which are often referred to as the networking stack. The DMA engine 116 includes hardware, software, and/or firmware configured to implement direct memory access functionality. The service engine 118 includes hardware, software, and/or firmware configured to implement a service such as, for example, data compression, decompression, encryption, and/or decryption. Other services could be provided by the service engine. The cache engine 120 includes hardware, software, and/or firmware configured to manage the caching of data (e.g., data packets at the I/O system). As is described below, the cache engine generates meta-IDs corresponding to received data and manages a cache table that includes the meta-IDs. The buffer 122 includes memory (e.g., volatile memory) that enables data packets to be temporarily buffered/cached at the I/O system. The PCIe interface 112 enables connection to the host via a PCIe physical link.

With regard to the host 104, the PCIe interface 130 enables connection to the NIC 102 via the PCIe link 106. The network engine 132 includes hardware, software, and/or firmware implementations of the networking protocols, e.g., L2, L3, and L4 protocols, which are often referred to as the networking stack. The storage engine 134 (also referred to as the storage stack) includes hardware, software, and/or firmware configured to implement data storage operations.

With reference to FIG. 1A, data is received at the network interface 110 of the NIC 102. For example, data packets are received on a 25 Gbps or 100. Gbps Ethernet interface of the NIC. In the embodiment of FIG. 1A, incoming data packets (as indicated by arrow 150) are processed by the network engine 114 according to known networking protocols, including layer 2, layer 3, and layer 4 protocols.

In an embodiment, the NIC 102 is configured to handle 9 kB Maximum Transmission Units (MTUs) and the NIC includes 4 kB data buffers that use a Scatter/Gather List (SGL). As is described below, the cache engine 120 is configured to implement a caching policy that includes meta-ID management.

Once data is received at the NIC 102 by the network engine 114, the data is cached at the NIC. For example, data packets (e.g., L2 or L3 data packets) are copied to a buffer in the NIC, referred to herein as a packet buffer. FIG. 1A depicts a packet (packet_2) cached in the buffer 122, and held until it is cleared from the cache.

Figure 2:
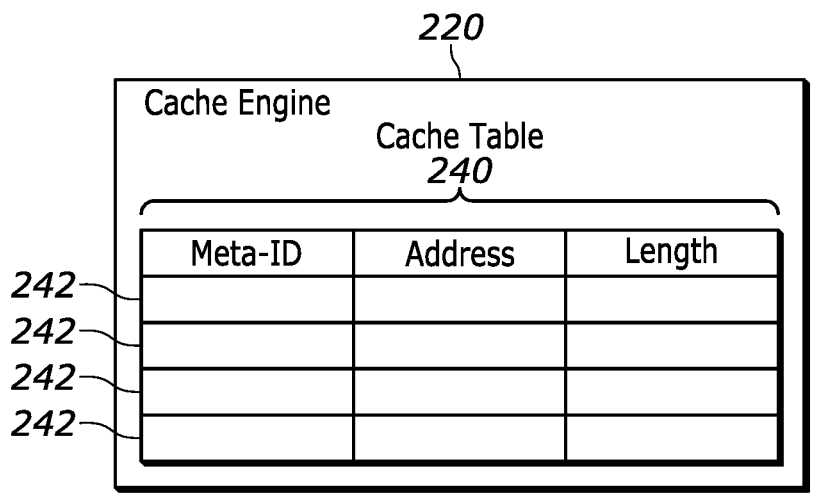
FIG. 2 depicts an expanded view of a cache table that is maintained at the NIC by a cache engine.

In addition to caching the data at the NIC 102, cache entries are generated and stored for the cached data. For example, the cache engine 120 creates a cache entry 140 for each cached data packet that is cached at the NIC. In an embodiment, each cache entry includes an address of the cached data, a length of the cached data, and a meta-ID that corresponds to the cached data. For example, the meta-ID can be a 32-bit unsigned value with a maximum of $4 \times 10^9$ values, with the "0" value being invalid. The meta-IDs can be monotonically increased for each new cache entry. In an embodiment, the cache engine creates meta-IDs for each packet that is less than or equal to the MTU. FIG. 1A also depicts a cache table 140 maintained by the cache engine that includes entries; cache_ent0, cache_ent1, cache_ent2, . . . cache_entM, where M is an integer greater than or equal to one, and an expanded view of a cache entry 142. In an embodiment, the cache table is maintained as a searchable table in a content-addressable memory (CAM). FIG. 2 depicts an expanded view of a cache table 240 that is maintained at the NIC by a cache engine 220. As shown in FIG. 2, each table entry 242 includes a meta-ID, an address (e.g., a buffer address), and a length (e.g., a length of the packet in bytes or kilobytes (kB)). The table can be searched via the meta-ID to determine if a data element (e.g., a packet) is cached in the packet buffer of the NIC. In an embodiment, the cache table is stored in CAM and searchable on the meta-ID field.

Figure 1B:
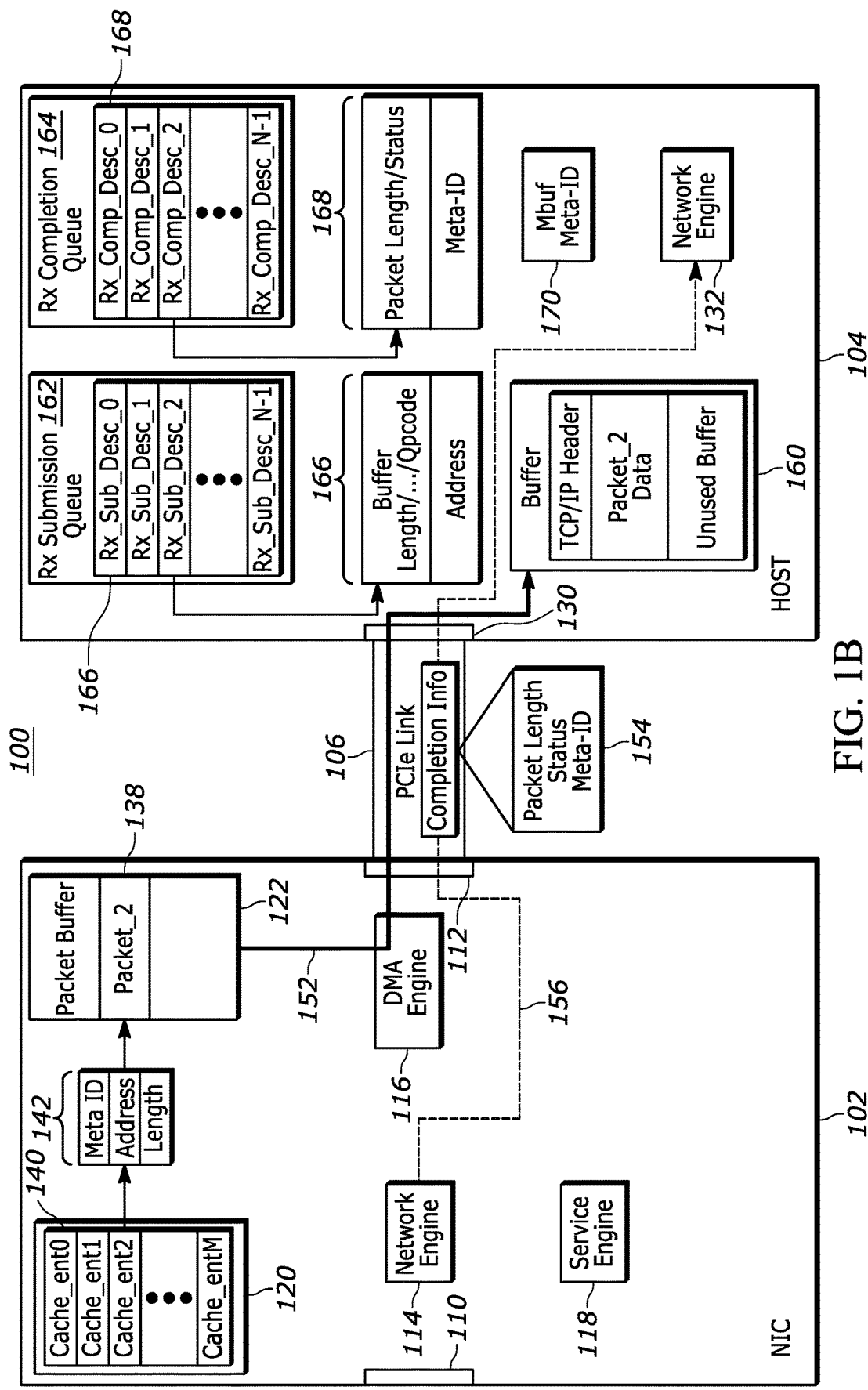
FIG. 1B illustrates a packet being written to the host over the PCIe link using the DMA engine of the NIC.

Once the data is received and cached at the NIC 102, the data is written to the host 104 via the PCIe interface 112 that forms part of the PCIe link 106. In an embodiment, writing the data to the host via the PCIe interface involves the DMA engine 116 writing the data to a host buffer (mbuf) of the host via the PCIe interface. FIG. 1B illustrates a packet being written to the host over the PCIe link 106 using the DMA engine 116 of the NIC (as indicated by arrow 152). FIG. 1B also depicts the packet that is cached at the NIC (packet_2) being stored in a buffer 160 of the host. In an embodiment, the packet is stored with a protocol header such as an L3/L4 header. In an embodiment, the host buffer includes chained 4 kB buffers, e.g., mbufs, which are similar to Linux skbuf.

Once the data is written from the NIC 102 to the host 104 via the PCIe interfaces 112 and 130 of the PCIe link 106, the network engine 114 of the NIC writes completion information 154 (as indicated by dashed line 156) to a corresponding RX completion descriptor in an RX completion queue. For example, the network engine of the NIC writes a packet length and a status to the corresponding RX completion descriptor in the RX completion queue. In accordance with an embodiment of the invention, the completion information also includes the meta-ID that corresponds to the packet that is cached at the NIC. As is described below, the meta-ID is included in a service request descriptor and used by the NIC to identify cached packets.

FIG. 1B also depicts an RX submission queue 162, an RX completion queue 164, the buffer 160 (e.g., mbuf), and the network engine 132 of the host 104. In an embodiment, the RX submission queue and the RX completion queue work in concert with each other as is known in the field to manage packets that are received at the NIC and written to the host. As illustrated in FIG. 1B, the RX submission queue includes example queue entries 166, also referred to as RX submission descriptors, of RX_Sub_Desc_0, RX_Sub_Desc_1, RX_Sub_Desc_2, . . . RX_Sub_Desc_N−1, and the RX completion queue includes example queue entries 168, also referred to as RX completion descriptors, of RX_Comp_Desc_0, RX_Comp_Desc_1, RX_Comp_Desc_2, . . . RX_Comp_Desc_N−1, where N is an integer of greater than one. An example expanded view of an RX submission descriptor 166 as shown in FIG. 1B includes a buffer length, an address, and an Opcode and an expanded view of an RX completion descriptor 168 as shown in FIG. 1B includes a packet length, a status, and a meta-ID. As is known in the field, the RX submission queue and the RX completion queue have one-to-one correspondence between RX submission descriptors and RX completion descriptors. In an embodiment, the RX submission queue and the RX completion queue are embodied as ring queues as is known in the field. In an embodiment, the RX completion descriptors correspond one-to-one with received packets (e.g., Ethernet packets) when the NIC does not support hardware based large receive offload (LRO)/receive segment coalescing (RSC).

As depicted in FIG. 1B, the meta-ID of a packet is saved in a meta field of header mbuf 170. In an embodiment, data buffers of the mbuf of the host memory 136 are 4 kB in size and multiple 4 kB buffers can be chained in case an MTU is larger than 4 kB. In an embodiment, the network engine of the NIC is configured for MTUs of 9 kB.

Once a data packet has been written across the PCIe link 106 to the host 104, the network engine 114 of the NIC 102 generates an RX completion interrupt and transmits the RX completion interrupt to the host. In an embodiment, the RX completion interrupt signals to a NIC driver at the host that processing of an RX completion descriptor has completed and as such a host Interrupt Service Routine (ISR) should check the status of the RX completion descriptor in the RX completion queue. Upon determination that the status of an RX completion descriptor is acceptable, the NIC driver at the host will send the corresponding packet to the network engine of the host. In an embodiment, transfer of mbuf ownership from the network engine of the host to the storage engine of the host is accomplished at the host.

In an embodiment, the mbuf (e.g., memory buffer in the kernel space) holds the address (e.g., virtual address, corresponding physical address is in RX submission descriptor) of the data buffer where the packet was written by the NIC along with the packet length and the meta-ID. For example, the storage of this information is part of an RX completion interrupt when the NIC driver at the host copies such data from the RX completion descriptor to a corresponding mbuf. In an embodiment, the physical address of the data buffer is in the RX submission descriptor, which points to the buffer address that was allocated to mbuf/skbuf. In a case where mbuf buffer is partitioned in 9 KB blocks (e.g., for 9 KB MTUs) and the host architecture is configured for 4 KB pages (e.g., x86/ARM), RX submission descriptor will have an SGL list with three addresses, 4 KB, 4 KB, 1 KB. Similar to the RX submission descriptor and the RX completion descriptor, the NIC driver at the host maintains a ring of mbufs that map one-to-one to these two rings such that if there is an RX submission descriptor at index Z and an RX completion interrupt is received, based on the saved tail pointers maintained by the NIC driver for each RX submission ring, an interrupt handler will know that it needs to start processing the RX completion descriptor from index Z and if the RX completion descriptor is acceptable, the interrupt handler will select mbuf from driver software ring index Z.

Figure 1C:
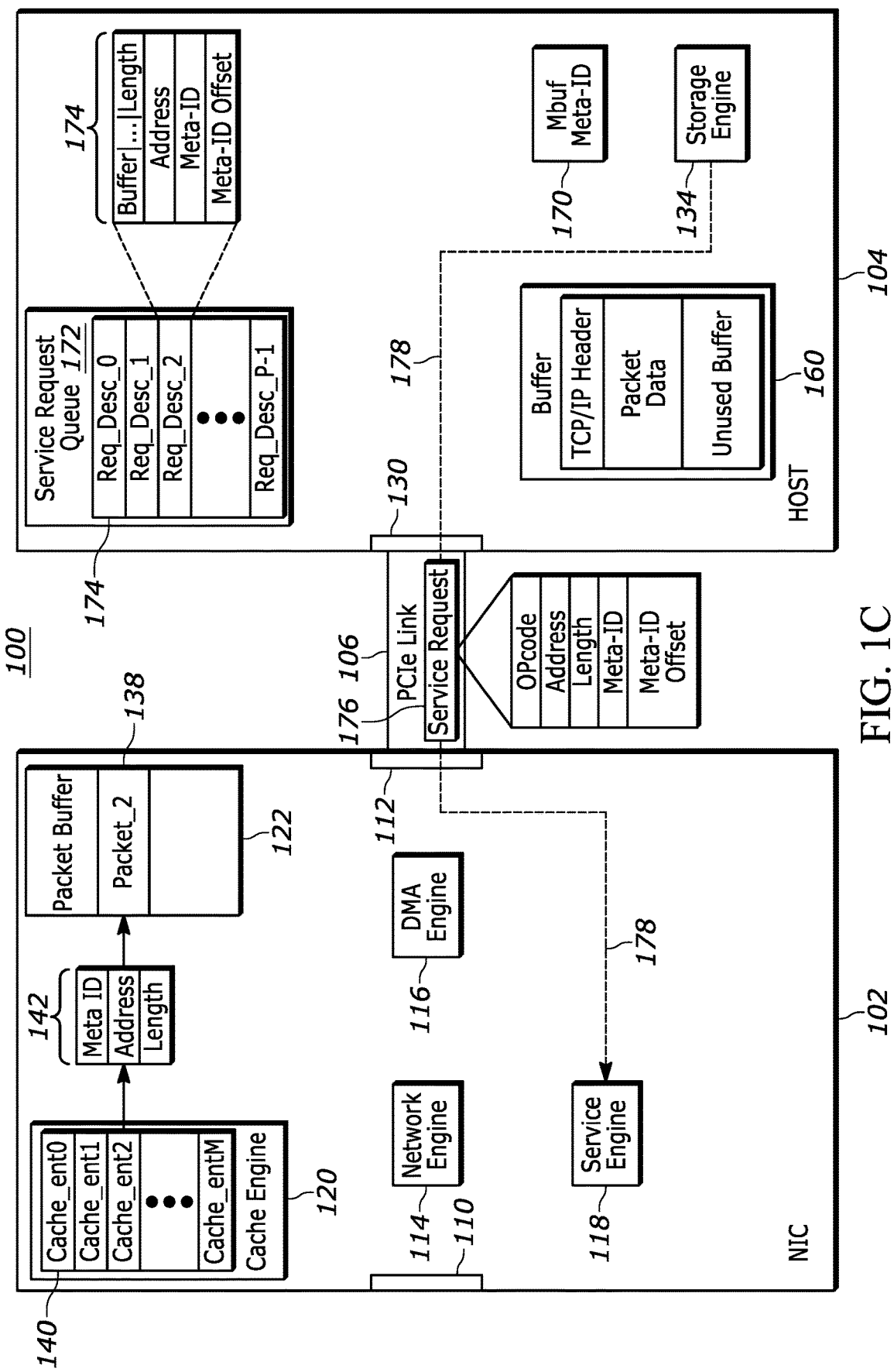
FIG. 1C depicts operations implemented by the storage engine of the host and shows a service request queue that is maintained at the host by the storage engine.

FIG. 1C depicts operations implemented by the storage engine 134 of the host 104 and shows a service request queue 172 that is maintained at the host by the storage engine. As shown in FIG. 1C, the service request queue includes queue entries 174, also referred to as request descriptors, Req_Desc_0, Req_Desc_1, Req_Desc_2, . . . Req_Desc_P–1, where P is an integer of greater than one, and an example expanded view of a request descriptor 174 as shown in FIG. 1C includes a buffer length, an Opcode, an address, a meta-ID, and a meta-ID offset, which corresponds to the length of the packet header.

At some point, the host 104 may make a request for the NIC 102 to perform some service related to data (e.g., a packet) that is held at the host. For example, the storage engine 134 of the host may make a request for the data to be compressed, for the data to be encrypted, for the data to be mirrored (e.g., transmitted as is) to another host, or for other services provided by the NIC, often referred to as offload services. In a particular example, the storage engine of the host makes a request to compress a packet of data that is stored in the buffer 160 of the host. As part of such a request, the storage engine of the host includes the meta-ID corresponding to the packet in a service request 176 that is sent to the NIC (as indicated by dashed line 178). For example, the meta-ID is included in a service request descriptor. FIG. 1C depicts the service request 176 including the meta-ID being sent to the NIC via the PCIe interfaces 130 and 112 that form the PCIe link 106. In an embodiment, the storage engine 134 of the host works on a granularity of 4 kB buffers. Thus, for a 9 kB MTU, three 4 kB buffers will have the same meta-ID included in the corresponding service requests, which will work when the NIC maintains the meta-IDs on an MTU (9 kB) boundary. In an embodiment, multiple service requests corresponding to 4 kB buffers could be chained to form 8 kB or 32 kB buffers for compression.

Figure 1D:
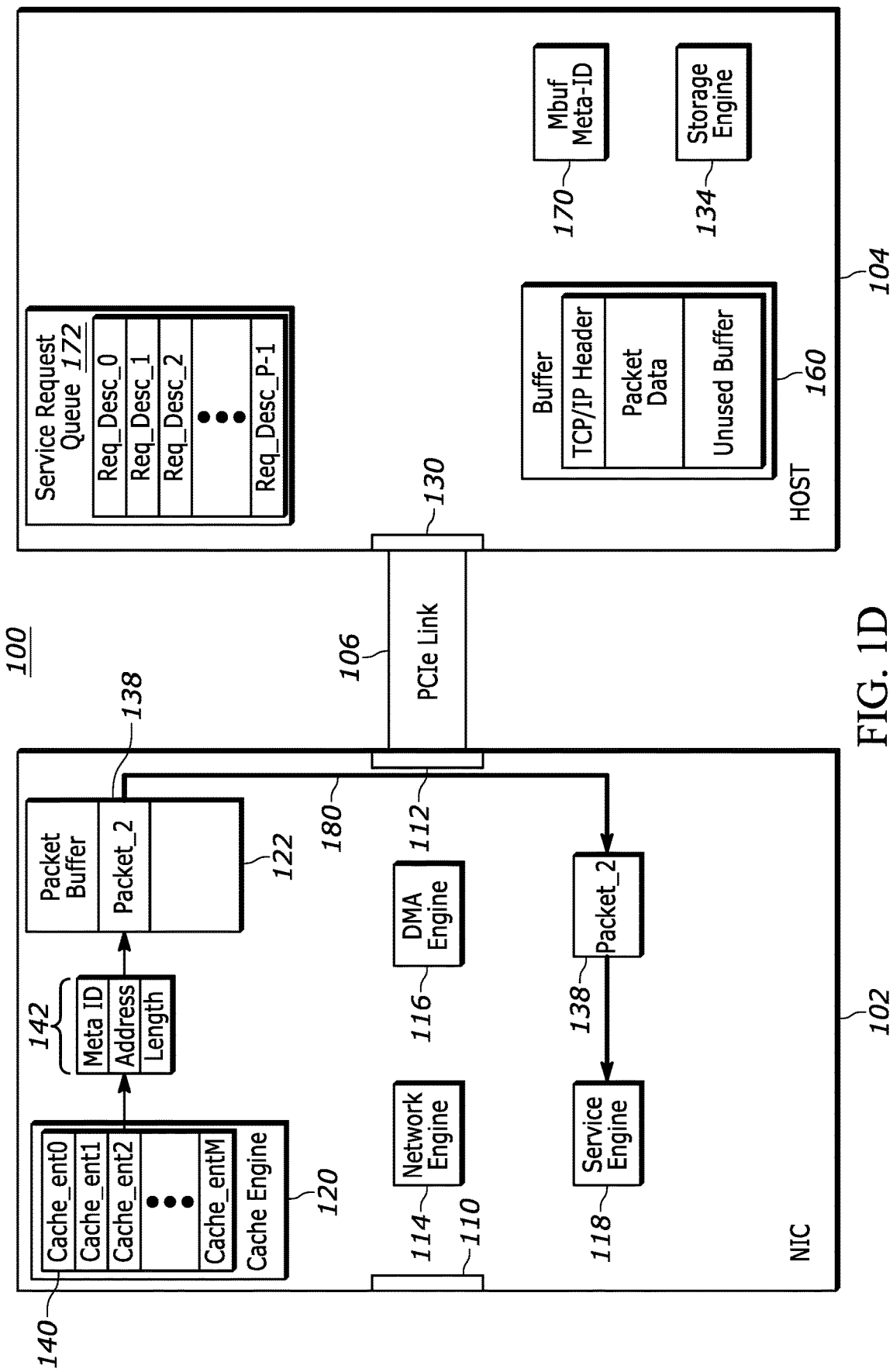
FIG. 1D illustrates a cached packet being accessed by the service engine from the buffer of the NIC.

Once the NIC 102 receives a service request 176 (e.g., via a service request descriptor) from the host 104, the service engine 118 at the NIC will process the service request. Assuming the service request is a request to perform some operation on a data packet that is stored in the host 106, the service engine will begin a process of fetching the data packet from the host. In a conventional system without packet caching at the NIC, the service engine will read the data packet from the host via the PCIe link 106. The reading of the data packet over the PCIe link will consume valuable resources of the PCIe link. In accordance with an embodiment of the invention, instead of reading the packet from the host, the service engine will first check to see if the data packet is cached at the NIC and if the data packet is cached at the NIC, the data packet is accessed from the cache without having to read the data packet from the host via the PCIe interface. In particular, the meta-ID that is included in the service request descriptor is used to search the cache table that is maintained at the NIC. If there is not a cache hit, then the corresponding data packet will need to be read from the host via the PCIe link and no particular efficiency is realized. However, if there is a cache hit, then the corresponding data packet is retrieved directly from the buffer of the NIC, which does not involve reading the packet from the host via the PCIe link. FIG. 1D illustrates (as indicated by arrow 180) a cached packet 138 (e.g., packet_2) being accessed by the service engine 118 from the buffer 122 of the NIC. In an embodiment, the meta-ID offset identifies an offset between the network header portion of a data packet and the payload portion of the data packet, which can be helpful in implementing a service. For example, it may be desirable to compress and/or encrypt only the payload portion of a data packet.

Figure 1E:
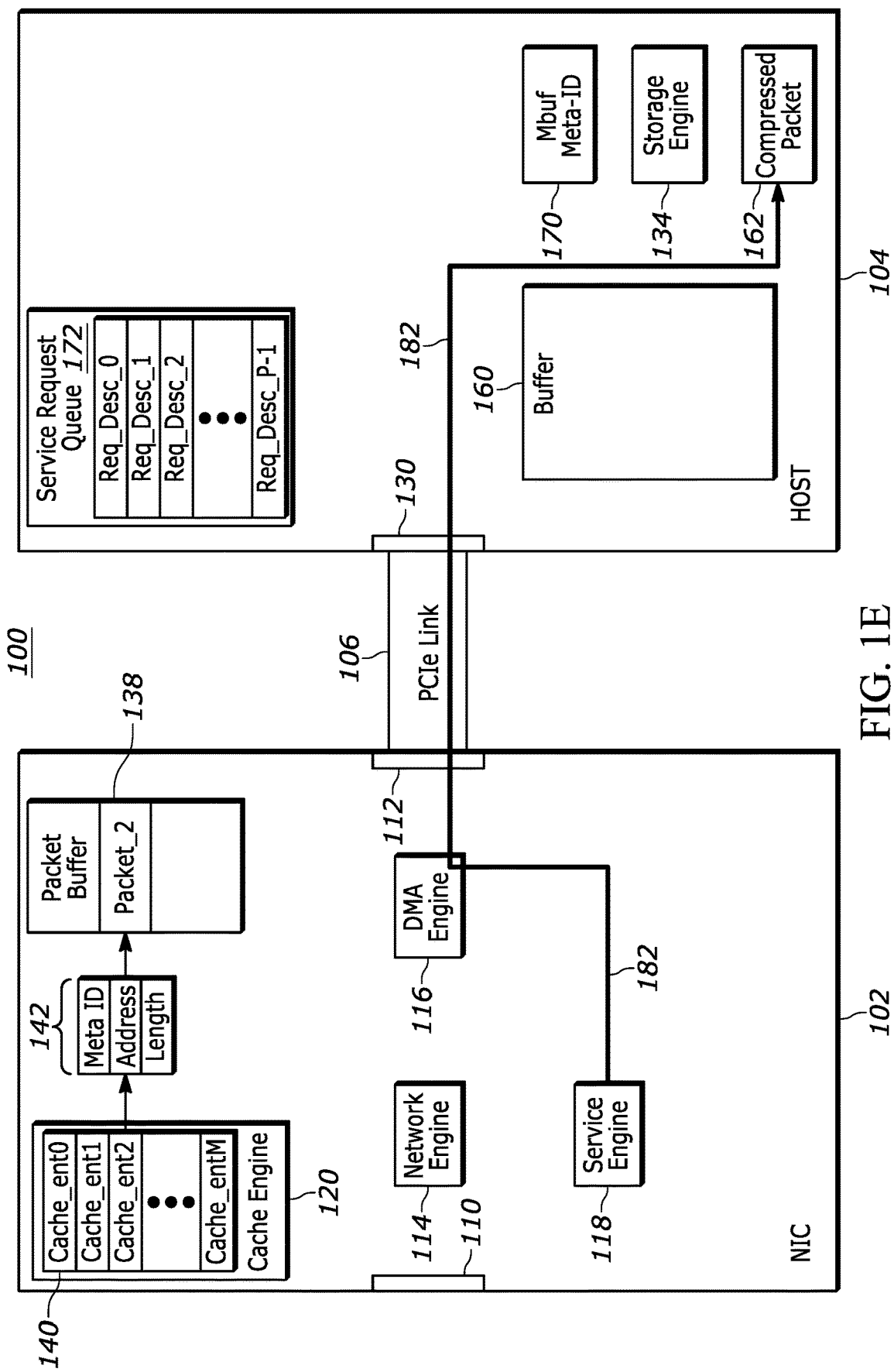
FIG. 1E illustrates the processed data being written to the host via the DMA engine and the PCIe link and stored as compressed packet.

In an embodiment, the service performed on the data packet by the service engine 118 at the NIC 102 is a compression service and the compressed data is to be written back to the host 104. Thus, upon compression of the data at the NIC, the compressed data is written to the host via the DMA engine 116 and the PCIe link 106. FIG. 1E illustrates (as indicated by arrow 182) the processed (e.g., compressed) data being written to the host via the DMA engine and the PCIe link and stored as compressed packet 162.

Figure 1F:
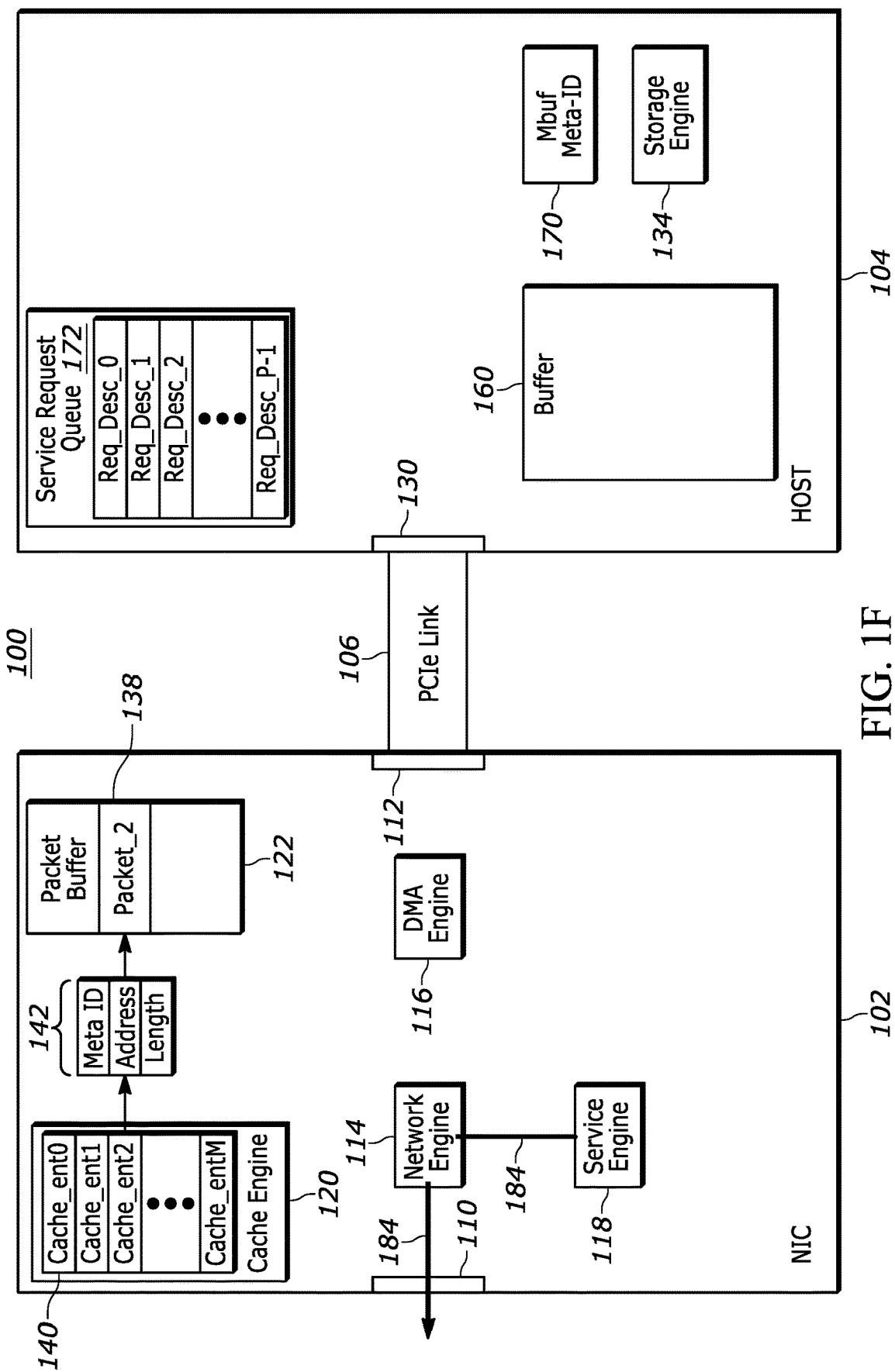
FIG. 1F illustrates the processed data being transmitted from the network interface of the NIC.

In another embodiment, the service performed on the data packet by the service engine 118 at the NIC 102 is a compression service and the compressed data is to be transmitted to some other computing system via the network interface of the NIC. Thus, upon compression of the data, the compressed data is transmitted from the NIC via the network interface. FIG. 1F illustrates (as indicated by arrow 184) the processed (e.g., compressed) data being transmitted from the network interface 110 of the NIC 102.

In both of the cases described with reference to FIGS. 1E and 1F, one transfer of the data packet over the PCIe link 106 that connects the NIC 102 to the host 104 is avoided. That is, because the data was cached at the NIC at the time the compression request was received from the host, the compression operation is performed on the cached data without having to read the data from the host via the PCIe link. Avoiding the transfer of the data packet through the PCIe interface conserves PCIe resources, which PCIe resources can be used for other operations, thus improving performance of the NIC/host computing system. Additionally, avoiding the transfer of data via the PCIe link can reduce latency of operations related to host service requests.

Figure 3:
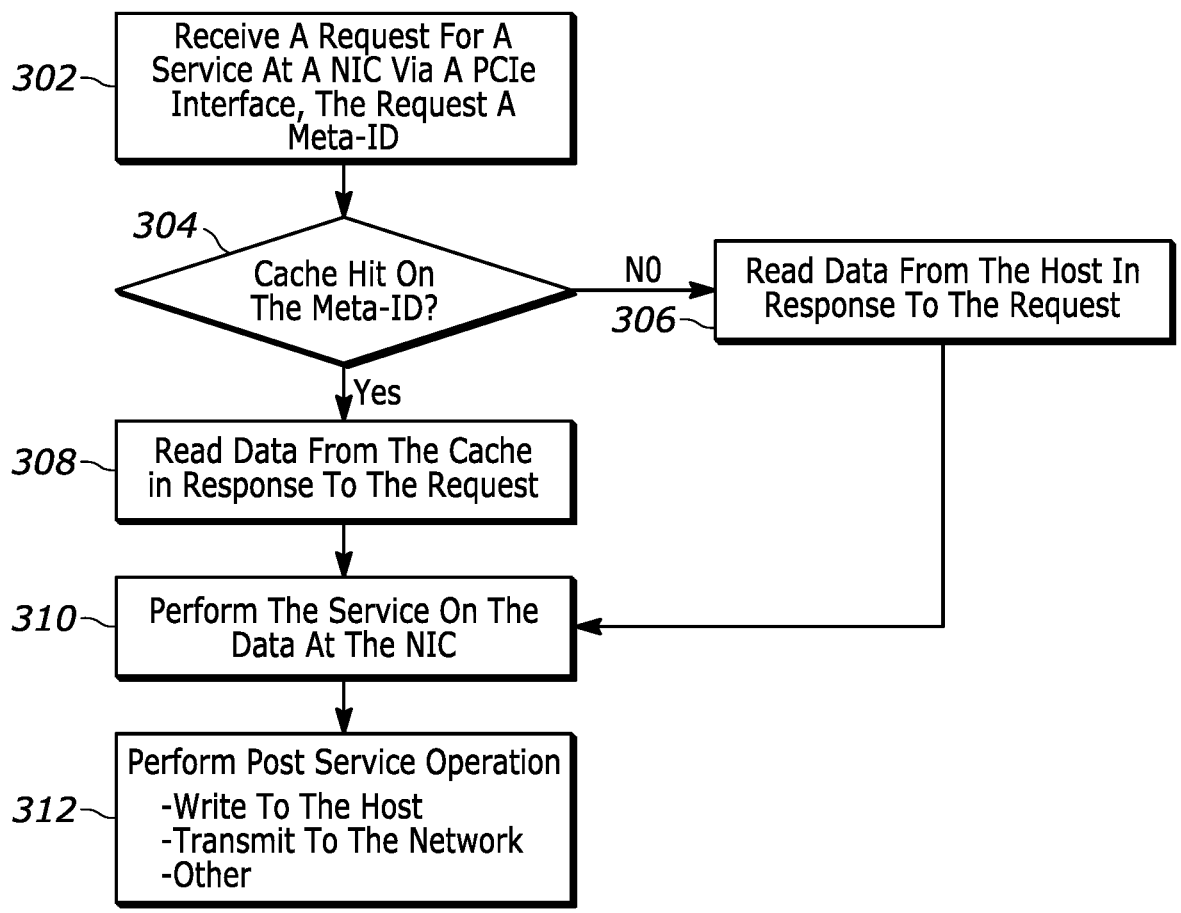
FIG. 3 is a process flow diagram of a method for operating an I/O system such as a NIC.

FIG. 3 is a process flow diagram of a method for operating an I/O system such as a NIC. At block 302, a request for a service is received at a NIC via a PCIe interface, the request including a meta-ID. At decision point 304, it is determined if there is a cache hit on the meta-ID. For example, a service engine of the NIC searches a cache table to see if there is a matching meta-ID. If there is not a cache hit, then at block 306, data is read from the host in response to the request. However, if there is a cache hit, then at block 308, the data is read from the cache in response to the request. Because the data is read from the cache instead of from the host, the data does not have to traverse the PCIe interface, thus saving PCIe resources. Whether the data is read from the host or from the local cache, at block 310, the service is performed on the data at the NIC. For example, the service may involve compressing the data, decompressing the data, encrypting the data, decrypting the data, or some combination thereof. Once the service is performed on the data, at block 312, some post-service operation is performed. For example, the data may be written to the host via the PCIe interface, the data may be transmitted onto a network via the network interface, or some other operation may be performed.

Figure 4:
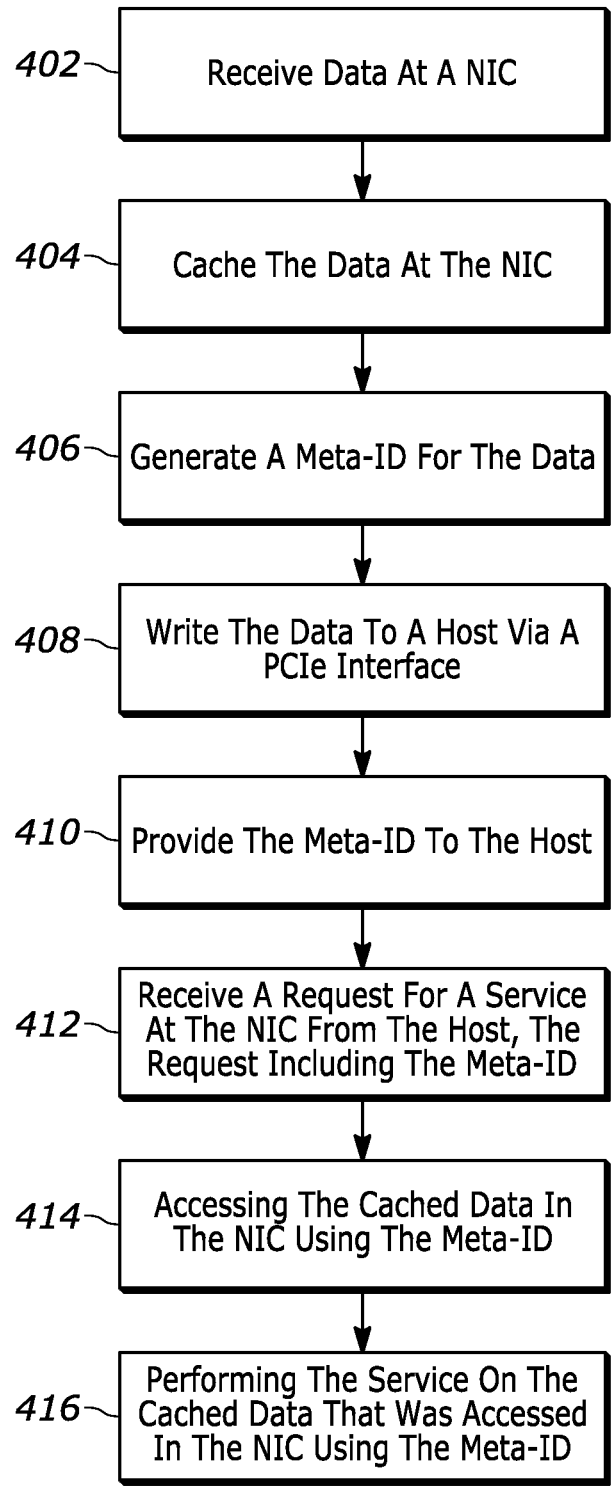
FIG. 4 is a process flow diagram of a method for operating an I/O device such as a NIC.

FIG. 4 is a process flow diagram of a method for operating an I/O device such as a NIC. At block 402, data is received at a NIC. At block 404, the data is cached at the NIC. At block 406, a meta-ID is generated for the data. At block 408, the data is written to a host via a PCIe interface. At block 410, the meta-ID is provided to the host. At block 412, a request for a service is received at the NIC from the host, the request including the meta-ID. At block 414, the cached data is accessed in the NIC using the meta-ID. At block 416, the service is performed on the cached data that was accessed in the NIC using the meta-ID. Because the service is performed on the cached data, the data does not need to be read from the host via the PCIe interface/PCIe link, thus reducing the bandwidth usage on the PCIe link and reducing latency of the service.

Figure 5:
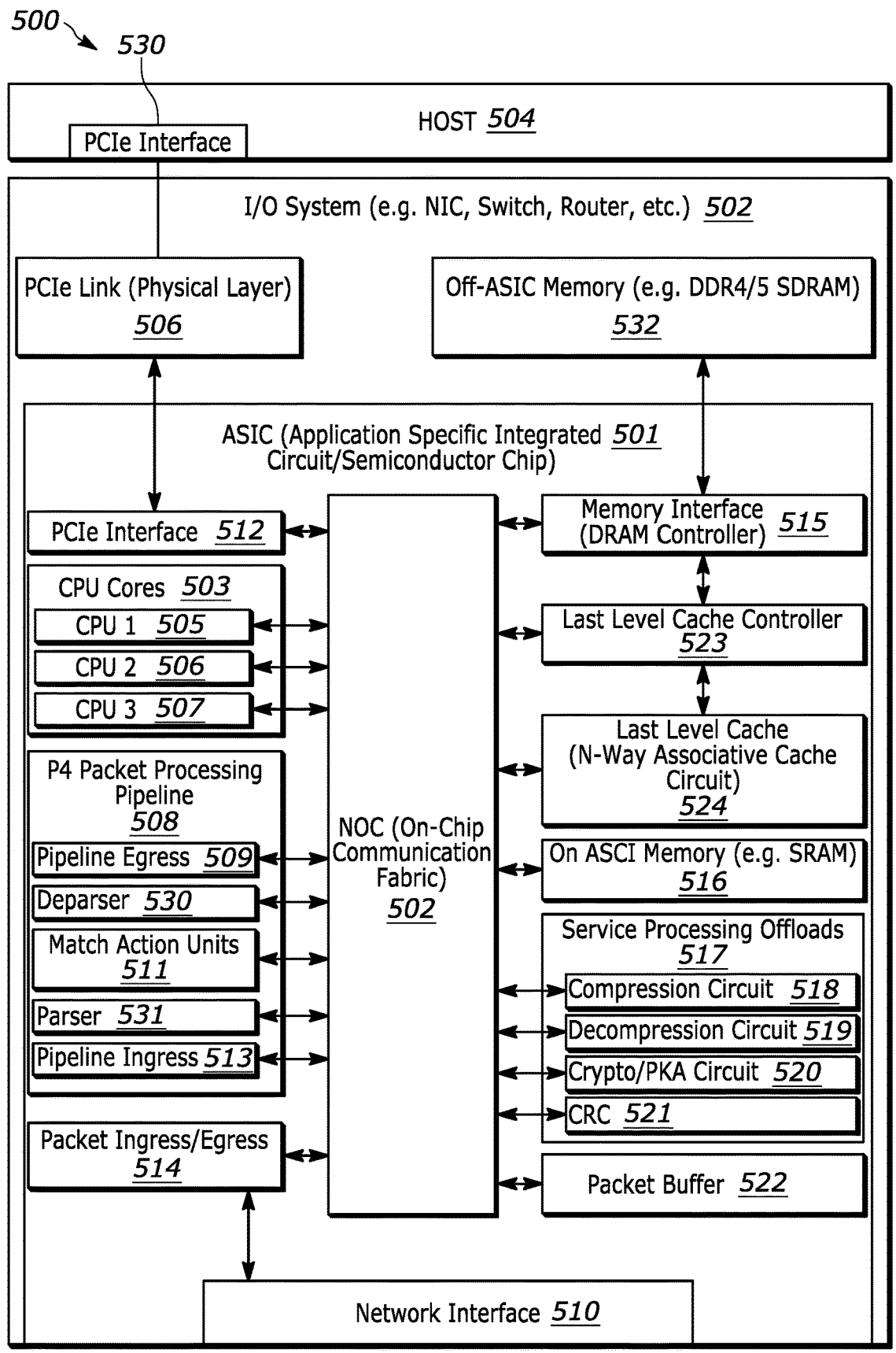
FIG. 5 depicts an example of a computing system that includes an I/O system, such as a NIC, and a host that are connected via PCIe link.

FIG. 5 depicts an example of a computing system 500 that includes an I/O system 502, such as a NIC, and a host 504 that are connected via PCIe link 506. The techniques for caching data to avoid trips across the PCIe link as described herein may be implemented in the computing system described with reference to FIG. 5. In particular, FIG. 5 is a functional block diagram of a I/O system 502 such as a network interface controller/card (NIC) or a network switch having an application specific integrated circuit (ASIC) 501, according to some aspects. An I/O system that is a NIC includes a PCIe link 506 and can be connected to a PCIe interface 530 of a host computer 504, referred to herein as simply a host. A NIC can provide network services to the host and to virtual machines (VMs) running on the host. The I/O system includes an off-ASIC memory 532, and a network interface 510, e.g., ethernet ports. The off-ASIC memory can be one of the widely available memory modules or chips such as DDR4 SDRAM modules or DDR5 SDRAM modules such that the ASIC has access to many gigabytes of memory. The network interface provides physical connectivity to a computer network such as the internet.

The ASIC 501 is a semiconductor chip having many core circuits interconnected by an on-chip communications fabric, sometimes called a network on a chip (NOC) 502. NOCs are often implementations of standardized communications fabrics such as the widely used advanced extensible interface (AXI) bus. The ASIC's core circuits can include a PCIe interface 512, central processing unit (CPU) cores 503, P4 packet processing pipeline 508 elements, memory interface 515, on ASIC memory (e.g., SRAM) 516, service processing offloads 517, a packet buffer 522, and packet ingress/egress circuits 514. The PCIe interface can be used to communicate with the host via the PCIe link 506. The CPU cores 503 can include numerous CPU cores such as CPU 1 505, CPU 2 506, and CPU 3 507. The P4 packet processing pipeline 508 can include a pipeline ingress circuit 513, a parser circuit 531, match-action units 511, a deparser circuit 530, and a pipeline egress circuit 509. The service processing offloads 517 are circuits implementing functions that the ASIC uses so often that the designer has chosen to provide hardware for offloading those functions from the CPUs. The service processing offloads can include a compression circuit 518, decompression circuit 519, a crypto/PKA circuit 520, and a CRC calculation circuit 521. The specific core circuits implemented within the non-limiting example of ASIC 501 have been selected such that the ASIC implements many, perhaps all, of the functionality of an InfiniBand channel adapter, of a non-volatile memory express (NVMe) card, and of a I/O system that processes network traffic flows carried by IP (internet protocol) packets.

The P4 packet processing pipeline 508 is a specialized set of elements for processing network packets such as IP packets, NVMe protocol data units (PDUs), and InfiniBand PDUs. The P4 pipeline can be configured using a domain-specific language. The concept of a domain-specific language for programming protocol-independent packet processors, known simply as "P4," has developed as a way to provide some flexibility at the data plane of a I/O system. The P4 domain-specific language for programming the data plane of I/O systems is defined in the "P416 Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including network switches, network routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The memory interface 515 coordinates memory I/O operations to and from the off-ASIC memory 532. When the off-ASIC memory is DRAM, the memory controller may be called a DRAM controller. The ASIC can include a last level cache 524 and a last level cache controller 523. The last level cache 524 can include an N-way associative cache circuit. The last level cache controller 523 can include circuits for determining pool values, set values, tag values, cache hits, cache misses, etc. The last level cache 524 can be an N-way associative cache circuit that is used by DRAM controller 515 for caching DRAM input/output operations (a.k.a. memory I/O operations).

The CPU cores 503 can be general purpose processor cores, such as reduced instruction set computing (RISC) processor cores, advanced RISC machine (ARM) processor cores, microprocessor without interlocked pipeline stages (MIPS) processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be programmable using a general-purpose programming language such as C.

The CPU cores 503 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 503 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, caching, cache management, which may not be readily implementable through a domain-specific language such as P4, in a manner that provides fast path performance as is expected of data plane processing.

The packet buffer 522 can act as a central on-chip packet switch that delivers packets from the network interface 510 to packet processing elements of the data plane and vice-versa. The packet processing elements can include a slow data path implemented in software and a fast data path implemented by packet processing circuitry 508.

The packet processing circuitry 508 can be a specialized circuit or part of a specialized circuit implementing programmable packet processing pipelines. Some embodiments include a P4 pipeline as a fast data path within the I/O system. The fast data path is called the fast data path because it processes packets faster than a slow data path that can also be implemented within the I/O system. An example of a slow data path is a software implemented data path wherein the CPU cores 503 and memory 532 are configured via software to implement a slow data path.

All memory transactions in the NIC 502, including host memory transactions, on board memory transactions, and registers reads/writes may be performed via a coherent interconnect 502. In one non-limiting example, the coherent interconnect can be provided by a network on a chip (NOC) "IP core" (in this one context, "IP" is an acronym for intellectual property). Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 508, CPU cores 503, memory interface 515, and the PCIe interface 512. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

In an embodiment, the I/O system may include some components that are included in a network interface card that is directly attached to the host via the PCIe interface and some components that are implemented at a component that is connected via the network interface. For example, some of the services provided by the I/O system may be implemented in a local NIC and other services provided by the I/O system may be implemented in a component such as a top of rack (ToR) switch that is connected by a transmission medium such as twisted pair wires or optical fibers.

Although the interface between the host and the I/O system (e.g., NIC) is described as a PCIe interface, other high speed serial bus interfaces are possible.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
   receiving data at a network interface controller (NIC);
   caching the data at the NIC;
   generating a meta-identifier (meta-ID) for the data;
   writing the data to a host via a PCIe interface;
   providing the meta-ID to the host;
   receiving a request for a service at the NIC from the host, the request including the meta-ID;
   accessing the cached data in the NIC using the meta-ID; and
   performing the service on the cached data that was accessed in the NIC using the meta-ID.

2. The method of claim 1, wherein the meta-ID is provided to the host via an RX completion descriptor.

3. The method of claim 1, wherein the meta-ID is provided to the host via an RX completion descriptor for storage in an RX completion queue at the host.

4. The method of claim 1, wherein the meta-ID is stored at the host in an RX completion queue.

5. The method of claim 1, wherein the meta-ID is stored at the host as a RX completion descriptor of an RX completion queue.

6. The method of claim 1, wherein the data is cached in a volatile memory of the NIC.

7. The method of claim 1, wherein the request includes the meta-ID in a request descriptor that is provided to the NIC from the host.

8. The method of claim 1, wherein the service is an offload service.

9. The method of claim 1, wherein the service is a compression service.

10. The method of claim 1, wherein the service is an encryption service.

11. The method of claim 1, wherein performing the service on the cached data involves compressing the data at the NIC, the method further comprising writing the compressed data from the NIC to the host via the PCIe interface.

12. The method of claim 1, wherein performing the service on the cached data involves compressing the data at the NIC, the method further comprising transmitting the compressed data from the NIC via a network interface of the NIC.

13. The method of claim 1, further comprising after the service is performed on the cached data, transmitting the cached data from the NIC via a network interface of the NIC.

14. The method of claim 1, further comprising writing second data to the host via the PCIe interface, wherein the second data that is written to the host is generated in response to performance of the service.

15. The method of claim 1, wherein the data is written from the NIC to the host using a Direct Memory Access engine.

16. A network interface controller (NIC) comprising:
a network interface;
a PCIe interface;
memory; and
a processor configured to:
cache data that is received at the NIC in the memory;
generate a meta-identifier (meta-ID) for the data;
write the data to a host via the PCIe interface;
provide the meta-ID to the host;
receive a request for a service at the NIC from the host, the request including the meta-ID;
access the cached data in the memory of the NIC using the meta-ID; and
perform the service on the cached data that was accessed in the memory of the NIC using the meta-ID.

17. The NIC of claim 16, wherein the meta-ID is provided to the host via an RX completion descriptor and stored in an RX completion queue at the host.

18. A method comprising:
receiving a request for a service at a network interface controller (NIC) via a PCIe interface, the request including a meta-ID;
determining if there is cached data corresponding to the meta-ID at the NIC; and
if it is determined that there is cached data corresponding to the meta-ID at the NIC, performing the service on the cached data at the NIC using the meta-ID; and
if it is determined that there is not cached data corresponding to the meta-ID at the NIC, reading data from a host via the PCIe interface in response to the request and then performing the service on the read data.

19. The method of claim 18, further comprising writing second data to the host via the PCIe interface, wherein the second data that is written to the host is generated in response to performance of the service.

20. A method comprising:
receiving data at a Network Interface Controller (NIC);
caching the data at the NIC;
generating a meta-identifier (meta-ID) for the data;
writing the data to a host via a PCIe interface;
providing the meta-ID to the host;
generating, at the host, a request for a service, wherein the request includes the meta-ID;
providing the request from the host to the NIC;
accessing the cached data in the NIC using the meta-ID; and
performing the service on the cached data that was accessed using the meta-ID.

21. The method of claim 20, wherein the meta-ID is provided from the NIC to the host in an RX completion descriptor and wherein the RX completion descriptor is stored in an RX completion queue of the host.

22. The method of claim 20, further comprising writing second data to the host via the PCIe interface, wherein the second data that is written to the host is generated in response to performance of the service.

23. The method of claim 20, wherein performing the service on the cached data involves compressing the data, the method further comprising writing the compressed data to the host via the PCIe interface.

* * * * *